(12) United States Patent
Wang et al.

(10) Patent No.: US 12,743,495 B2
(45) Date of Patent: Sep. 22, 2026

(54) MOBILE DEVICE MANAGEMENT USING ARTIFICIAL INTELLIGENCE

(71) Applicant: Lenovo (United States) Inc., Morrisville, NC (US)

(72) Inventors: Xueshi Wang, Cary, NC (US); Andrew Hansen, Raleigh, NC (US)

(73) Assignee: Lenovo (United States) Inc., Morrisville, NC (US)

( * ) Notice: Subject to any disclaimer, the term of this patent is extended or adjusted under 35 U.S.C. 154(b) by 21 days.

(21) Appl. No.: 18/898,347

(22) Filed: Sep. 26, 2024

(65) Prior Publication Data

US 2026/0087110 A1 Mar. 26, 2026

(51) Int. Cl.
*G06F 21/31* (2013.01)

(52) U.S. Cl.
CPC .................................. *G06F 21/31* (2013.01)

(58) Field of Classification Search
CPC ...................................................... G06F 21/31
See application file for complete search history.

(56) References Cited

U.S. PATENT DOCUMENTS

| | | | | |
|---|---|---|---|---|
| 2009/0276223 | A1* | 11/2009 | Jaiswal | G10L 17/00 704/E15.005 |
| 2018/0077148 | A1* | 3/2018 | Bhat | H04L 63/0853 |
| 2022/0086169 | A1* | 3/2022 | Kumar | H04W 12/65 |
| 2023/0206928 | A1* | 6/2023 | Yeung | G10L 15/26 704/246 |
| 2023/0418582 | A1* | 12/2023 | Nagarajan | G06F 8/65 |

* cited by examiner

*Primary Examiner* — Amie C. Lin
(74) *Attorney, Agent, or Firm* — Schwegman Lundberg & Woessner, P.A.

(57) ABSTRACT

An admin provides a voice sample to a mobile device management (MDM) system. The MDM system provides an MDM agent for download by a plurality of mobile devices and creates a one-time passcode (OTP). The OTP permits the plurality of mobile devices that are administered by the admin person to access the MDM system. The MDM system displays the OTP on a computer display device. The admin verbalizes the OTP, which is sensed by the plurality of mobile devices. The MDM system analyzes the verbalization of the OTP via one or more artificial intelligence processes, and it registers the plurality of mobile devices when the artificial intelligence processes verify authenticity of the admin person.

20 Claims, 3 Drawing Sheets

MOBILE DEVICE MANAGEMENT USING ARTIFICIAL INTELLIGENCE

TECHNICAL FIELD

Embodiments described herein relate to mobile device management (MDM) by an administrator using artificial intelligence.

BACKGROUND

Enrollment of devices to a mobile device management (MDM) system can often be cumbersome. Some MDM/device combinations offer one-touch or even zero-touch enrollment, but most devices are not capable of this and therefore require more complicated methods.

MDM enrollment processes differ depending on the devices in question. For Windows-based PCs, the process often requires manual download and installation of the MDM client app or agent, followed by entering some credentials or other information that identifies the admin's MDM organization. For Android OS-based mobile devices, the fastest process is usually to scan a QR code using the device's camera. However, many Android devices (especially AOSP devices including XR, IoT, and wearables) lack the capability to scan QR codes which leaves a series of steps where the admin must enable the device's developer mode (which is a hidden setting on many devices), connect the device to a PC via USB cable, download the MDM provisioning file, and finally copy the file to the correct file path on the device, all of which can be confusing and difficult depending on the admin's experience and comfort level (especially if the admin must use a command line interface). Regardless of the device and its needed enrollment process, if any manual intervention is required, then it must be considered that admins often register hundreds of devices at a time, which therefore makes this a lengthy process.

Thus, in view of the foregoing, the MDM enrollment process would benefit from a simplified and streamlined process.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

An embodiment relates to systems and methods of using artificial intelligence (AI), and in particular, using artificial intelligence to analyze voice input and data in a mobile device management (MDM) system.

Similar to fingerprints, every individual has unique vocal characteristics. An embodiment combines voice recognition with the usage of a one-time passcode (OTP) in order to validate MDM registration requests and to ensure they are coming from an authentic admin.

With this embodiment, devices that don't have the capabilities of scanning a QR code can still be registered to an MDM without the need of physically connecting the device to a PC or turning on a developer mode.

Figure 1:
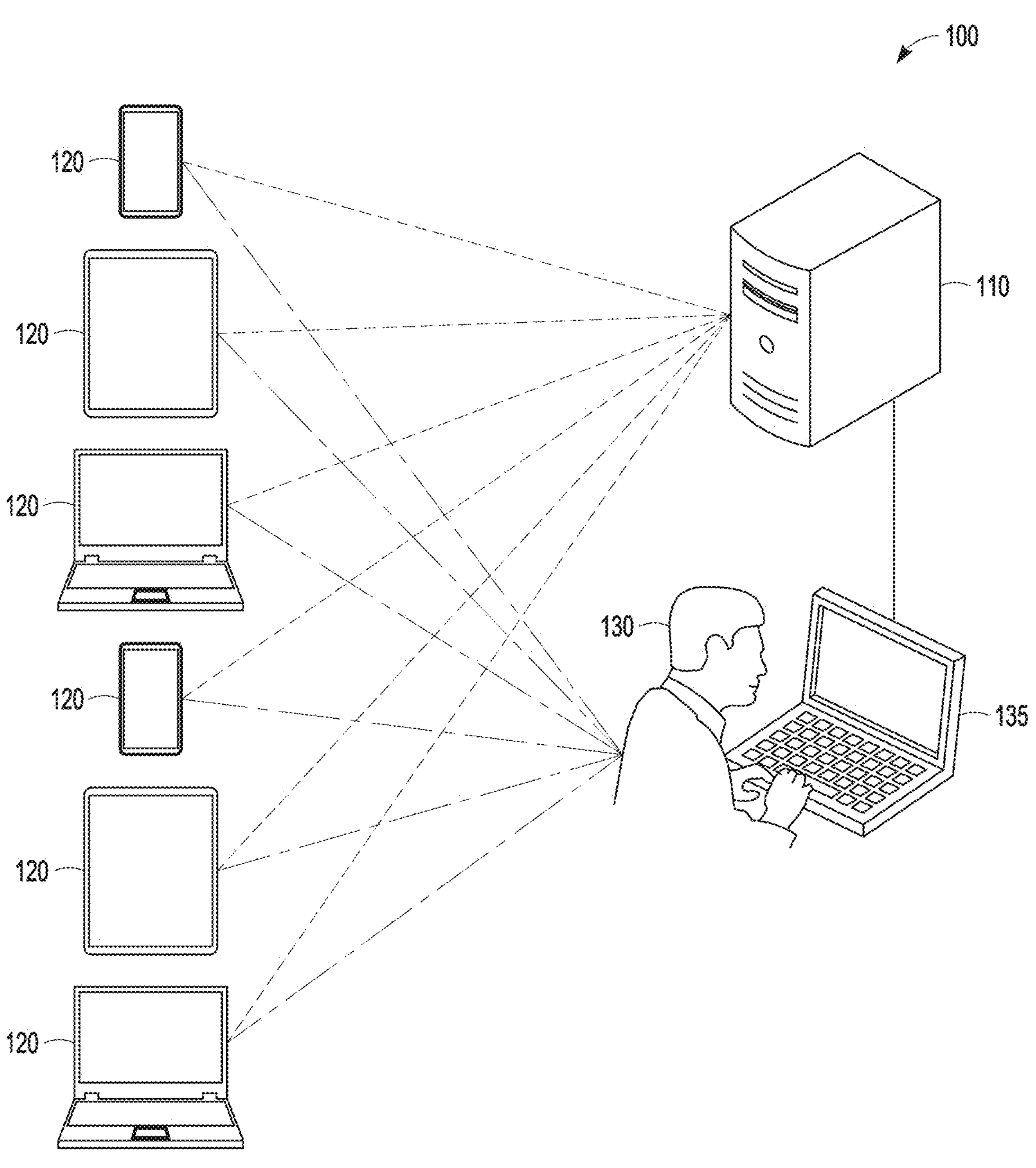
FIG. 1 is a block diagram of a mobile device management (MDM) system that uses a verbalization process and artificial intelligence.

FIG. 1 is a block diagram of a mobile device management (MDM) system 100 that uses a verbalization process and artificial intelligence. The MDM system 100 includes a processor 110. An admin 130 communicates with the MDM portal via a laptop or similar device 135. As will be described herein, an embodiment permits the admin 130 to vocally communicate with and then register a plurality of devices 120 using the MDM agent residing on the mobile devices.

A first step of the registration process requires that any admin planning to register devices to first establish their identity on a cloud portal of the MDM system. This is accomplished by providing a voice sample to the portal, which can be done via a browser wherein the admin reads a series of sentences, statements, phrases, letters, numbers or other text displayed on the portal user interface (UI) and the portal uses the browser's access to the device's microphone to record the admin's voice. The cloud portal then saves the recorded voice snippets as references to compare against later.

When the time comes for the admin to register a device to the portal, the first step needed is to download the MDM agent or client app to the device via existing means (e.g., an app store, an MDM website, etc.). The admin then opens the portal on a browser as before when recording their voice, this time starting a registration process. This process creates an OTP consisting of several characters and which is of sufficient complexity to ensure that it is unique to the admin's organization (and given the unique nature of this OTP, for added security it should ideally have a limited lifetime and/or limited number of devices that can use it). The admin then opens the MDM or client app on the device and enters the command to start the client app's registration process, at which point the client app records the admin's voice input as the admin verbalizes the OTP shown on the cloud portal. This recorded voice sample is then uploaded to the cloud portal and the voice recognition service on the portal uses a combination of AI techniques to analyze it.

A first AI technique is to use NLP to recognize the content of the submitted voice snippet, which is compared to the displayed OTP and checked for a 100% match. A second AI technique is to use ML voice recognition to analyze the vocal qualities of the submitted voice snippet, which are then compared with the previously saved reference snippets and checked for a match within acceptable bounds (i.e., this process identifies if this is the real admin or someone merely imitating the admin). If both of the above result in success, then validation is successful and the process of registering the device to the portal is completed.

Figure 2:
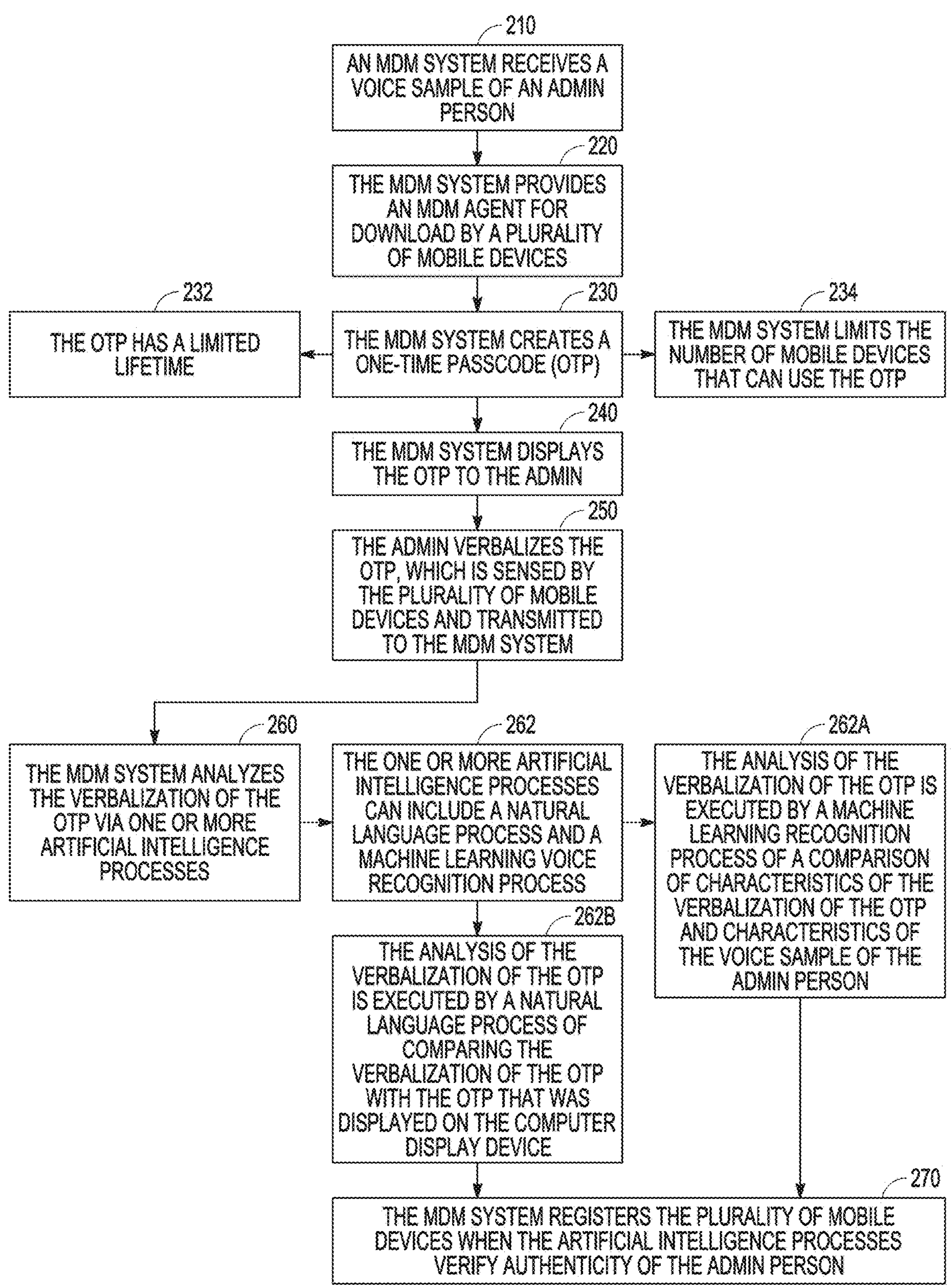
FIG. 2 is a block diagram illustrating operations and features of a mobile device management (MDM) system using artificial intelligence.

FIG. 2 is a block diagram illustrating operations and features of a system for that uses voice data and artificial intelligence to register devices in a mobile device management system. FIG. 2 includes a number of process and feature blocks 210-270. Though arranged substantially serially in the example of FIG. 2, other examples may reorder the blocks, omit one or more blocks, and/or execute two or more blocks in parallel using multiple processors or a single processor organized as two or more virtual machines or sub-processors.

Referring now to FIG. 2, at 210, an MDM system receives a voice sample of an admin person. At 220, the MDM system provides an MDM agent for download by a plurality of mobile devices.

At 230, the MDM system creates a one-time passcode (OTP). The OTP permits the plurality of mobile devices that are administered by the admin person to access the MDM system. In an embodiment, at 232, for security purposes, the OTP has a limited lifetime. For additional security, as indicated at 234, the MDM system limits the number of mobile devices that can use the OTP.

At 240, the MDM system displays the OTP to the admin. At 250, the admin verbalizes the OTP, which is sensed by the plurality of mobile devices and transmitted to the MDM system.

At 260, the MDM system analyzes the verbalization of the OTP via one or more artificial intelligence processes. As indicated at 262, the one or more artificial intelligence processes can include a natural language process and a machine learning voice recognition process. As indicated at 262A, the analysis of the verbalization of the OTP is executed by a machine learning recognition process of a comparison of characteristics of the verbalization of the OTP and characteristics of the voice sample of the admin person. And as indicated at 262B, the analysis of the verbalization of the OTP is executed by a natural language process of comparing the verbalization of the OTP with the OTP that was displayed on the computer display device.

Finally, at 270, the MDM system registers the plurality of mobile devices when the artificial intelligence processes verify authenticity of the admin person.

Figure 3:
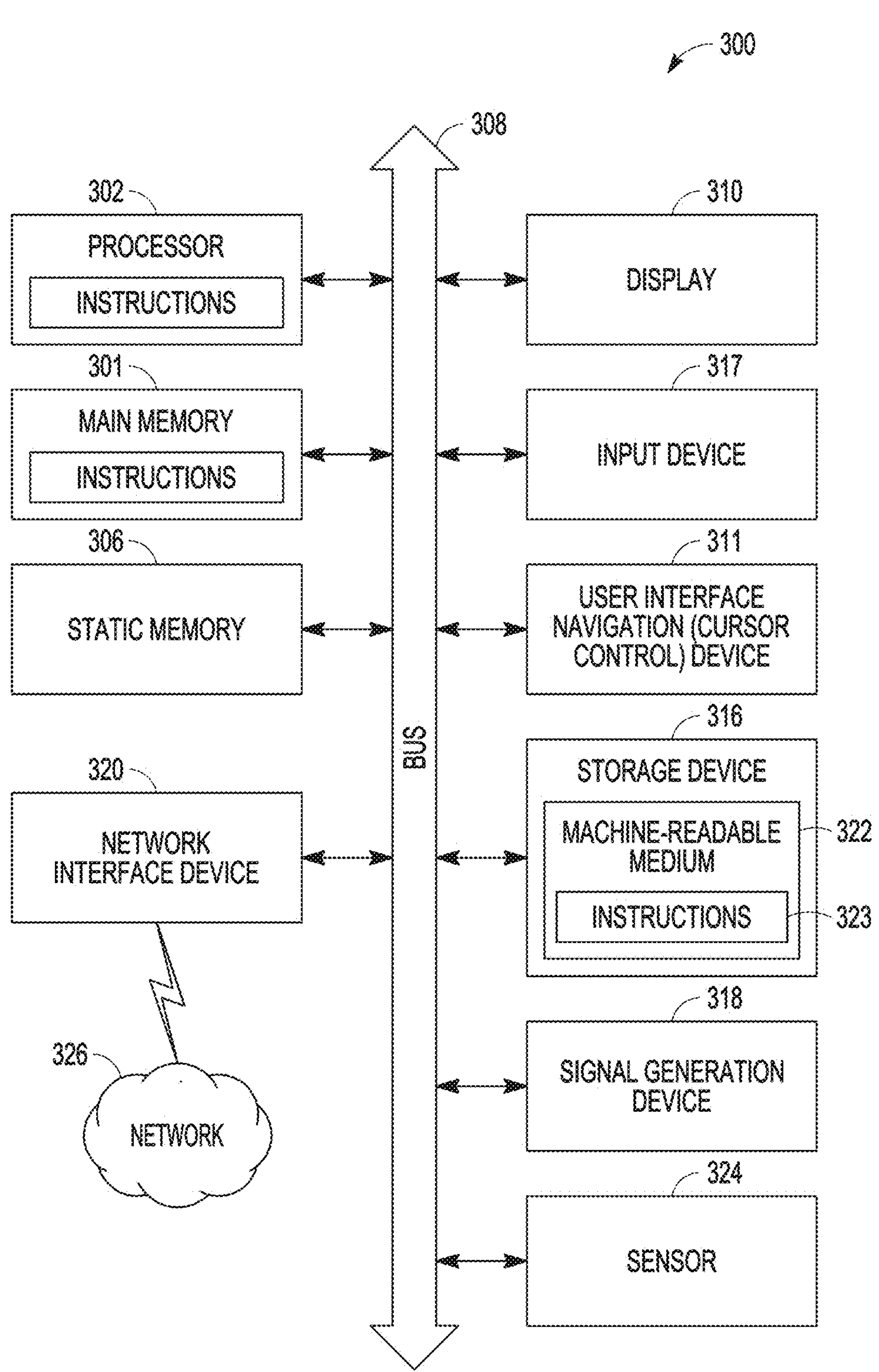
FIG. 3 is a block diagram of a computer architecture upon which one or more of the embodiments disclosed herein can execute.

FIG. 3 is a block diagram illustrating a computing and communications platform 300 in the example form of a general-purpose machine on which some or all the operations of FIG. 2 may be carried out according to various embodiments. In certain embodiments, programming of the computing platform 300 according to one or more particular algorithms produces a special-purpose machine upon execution of that programming. In a networked deployment, the computing platform 300 may operate in the capacity of either a server or a client machine in server-client network environments, or it may act as a peer machine in peer-to-peer (or distributed) network environments.

Example computing platform 300 includes at least one processor 302 (e.g., a central processing unit (CPU), a graphics processing unit (GPU) or both, processor cores, compute nodes, etc.), a main memory 301 and a static memory 306, which communicate with each other via a link 308 (e.g., bus). The computing platform 300 may further include a video display unit 310, input devices 317 (e.g., a keyboard, camera, microphone), and a user interface (UI) navigation device 311 (e.g., mouse, touchscreen). The computing platform 300 may additionally include a storage device 316 (e.g., a drive unit), a signal generation device 318 (e.g., a speaker), a sensor 324, and a network interface device 320 coupled to a network 326.

The storage device 316 includes a non-transitory machine-readable medium 322 on which is stored one or more sets of data structures and instructions 323 (e.g., software) embodying or utilized by any one or more of the methodologies or functions described herein. The instructions 323 may also reside, completely or at least partially, within the main memory 301, static memory 306, and/or within the processor 302 during execution thereof by the computing platform 300, with the main memory 301, static memory 306, and the processor 302 also constituting machine-readable media.

While the machine-readable medium 322 is illustrated in an example embodiment to be a single medium, the term "machine-readable medium" may include a single medium or multiple media (e.g., a centralized or distributed database, and/or associated caches and servers) that store the one or more instructions 323. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described.

However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

EXAMPLES

Example No. 1 is a mobile device management (MDM) process that includes receiving into a computer processor a voice sample of an admin person; providing an MDM agent by the computer processor for download by a plurality of mobile devices; creating a one-time passcode (OTP), the OTP for permitting the plurality of mobile devices administered by the admin person to access the computer processor; displaying the OTP on a computer display device; receiving into the computer processor a verbalization of the OTP, the verbalization of the OTP provided by the admin person and received by the plurality of mobile devices; analyzing the verbalization of the OTP via one or more artificial intelligence processes; and registering the plurality of mobile devices when the artificial intelligence processes verify authenticity of the admin person.

Example No. 2 includes all the features of Example No. 1, and optionally includes an MDM process wherein the one or more artificial intelligence processes comprise one or more of a natural language process and a machine learning voice recognition process.

Example No. 3 includes all the features of Example Nos. 1-2, and optionally includes an MDM process wherein the analyzing the verbalization of the OTP via the one or more artificial intelligence processes comprises a machine learning recognition process of a comparison of characteristics of the verbalization of the OTP and characteristics of the voice sample of the admin person.

Example No. 4 includes all the features of Example Nos. 1-3, and optionally includes an MDM process wherein the analyzing the verbalization of the OTP via the one or more artificial intelligence processes comprises a natural language process of comparing the verbalization of the OTP with the OTP that was displayed on the computer display device.

Example No. 5 includes all the features of Example Nos. 1-4, and optionally includes an MDM process wherein the computer processor is associated with a cloud server.

Example No. 6 includes all the features of Example Nos. 1-5, and optionally includes an MDM process wherein the OTP comprises a limited lifetime.

Example No. 7 includes all the features of Example Nos. 1-6, and optionally includes an MDM process wherein the OTP comprises a limit on a number of mobile devices that can use the OTP.

Example No. 8 includes all the features of Example Nos. 1-7, and optionally includes an MDM process wherein the computer display device is associated with a cloud portal interface or a web page.

Example No. 9 is a mobile device management (MDM) system that includes an MDM portal processor; and a computer memory coupled to the MDM portal processor; the MDM portal processor and the computer memory are operable for receiving into the MDM portal processor a voice sample of an admin person; providing an MDM agent by the MDM portal processor for download by a plurality of mobile devices; creating a one-time passcode (OTP), the OTP for permitting the plurality of mobile devices administered by the admin person to access the MDM portal processor; displaying the OTP on a computer display device; receiving into the MDM portal processor a verbalization of the OTP, the verbalization of the OTP provided by the admin person and received by the plurality of mobile devices; analyzing the verbalization of the OTP via one or more artificial intelligence processes; and registering the plurality of mobile devices when the artificial intelligence processes verify authenticity of the admin person.

Example No. 10 includes all the features of Example No. 9, and optionally includes an MDM system wherein the one or more artificial intelligence processes comprise one or more of a natural language process and a machine learning voice recognition process.

Example No. 11 includes all the features of Example Nos. 9-10, and optionally includes an MDM system wherein the analyzing the verbalization of the OTP via the one or more artificial intelligence processes comprises a machine learning recognition process of a comparison of characteristics of the verbalization of the OTP and characteristics of the voice sample of the admin person.

Example No. 12 includes all the features of Example Nos. 9-11, and optionally includes an MDM system wherein the analyzing the verbalization of the OTP via the one or more artificial intelligence processes comprises a natural language process of comparing the verbalization of the OTP with the OTP that was displayed on the computer display device.

Example No. 13 includes all the features of Example Nos. 9-12, and optionally includes an MDM system wherein the MDM portal processor is associated with a cloud server.

Example No. 14 includes all the features of Example Nos. 9-13, and optionally includes an MDM system wherein the OTP comprises a limited lifetime.

Example No. 15 includes all the features of Example Nos. 9-14, and optionally includes an MDM system wherein the OTP comprises a limit on a number of mobile devices that can use the OTP.

Example No. 16 includes all the features of Example Nos. 9-15, and optionally includes an MDM system wherein the computer display device is associated with a cloud portal interface or a web page.

Example No. 17 is a machine-readable medium comprising instructions that when executed by a processor execute a process comprising receiving into a computer processor a voice sample of an admin person; providing an MDM agent by the computer processor for download by a plurality of mobile devices; creating a one-time passcode (OTP), the OTP for permitting the plurality of mobile devices administered by the admin person to access the computer processor; displaying the OTP on a computer display device; receiving into the computer processor a verbalization of the OTP, the verbalization of the OTP provided by the admin person and received by the plurality of mobile devices; analyzing the verbalization of the OTP via one or more artificial intelligence processes; and registering the plurality of mobile devices when the artificial intelligence processes verify authenticity of the admin person.

Example No. 18 includes all the features of Example No. 17, and optionally includes a machine-readable medium wherein the one or more artificial intelligence processes comprise one or more of a natural language process and a machine learning voice recognition process.

Example No. 19 includes all the features of Example Nos. 17-18, and optionally includes a machine-readable medium wherein the analyzing the verbalization of the OTP via the one or more artificial intelligence processes comprises a machine learning recognition process of a comparison of characteristics of the verbalization of the OTP and characteristics of the voice sample of the admin person.

Example No. 20 includes all the features of Example Nos. 17-19, and optionally includes a machine-readable medium wherein the analyzing the verbalization of the OTP via the one or more artificial intelligence processes comprises a natural language process of comparing the verbalization of the OTP with the OTP that was displayed on the computer display device.

The invention claimed is:

1. A process of mobile device management (MDM) comprising:

receiving into a computer processor a voice sample of an admin person;

providing an MDM agent by the computer processor for download by a plurality of mobile devices;

creating a one-time passcode (OTP) by the computer processor, the OTP for permitting the plurality of mobile devices administered by the admin person to access the computer processor;

causing by the computer processor display of the OTP on a computer display device;

receiving into the computer processor verbalization of the OTP, the verbalization of the OTP provided by the admin person and recorded by the plurality of mobile devices and provided from the plurality of mobile devices to the computer processor;

analyzing by the computer processor the verbalization of the OTP based on the OTP that was displayed on the computer display device and the received voice sample of the admin person via one or more artificial intelligence processes; and registering the plurality of mobile devices by the computer processor in response to the one or more artificial intelligence processes verifying authenticity of the admin person.

2. The process of mobile device management of claim 1, wherein the one or more artificial intelligence processes comprise one or more of a natural language process and a machine learning voice recognition process.

3. The process of mobile device management of claim 1, wherein the analyzing the verbalization of the OTP via the one or more artificial intelligence processes comprises a machine learning recognition process of a comparison of characteristics of the verbalization of the OTP and characteristics of the voice sample of the admin person.

4. The process of mobile device management of claim 1, wherein the analyzing the verbalization of the OTP via the one or more artificial intelligence processes comprises a natural language process of comparing the verbalization of the OTP with the OTP that was displayed on the computer display device.

5. The process of mobile device management of claim 1, wherein the computer processor is associated with a cloud server.

6. The process of claim 1, wherein the OTP comprises a limited lifetime.

7. The process of claim 1, wherein the OTP comprises a limit on a number of mobile devices that can use the OTP.

8. The process of claim 1, wherein the computer display device is associated with a cloud portal interface or a web page.

9. A mobile device management (MDM) system comprising:

an MDM portal processor; and a computer memory coupled to the MDM portal processor;

wherein the MDM portal processor and the computer memory are operable for:

receiving into the MDM portal processor a voice sample of an admin person;

providing an MDM agent by the MDM portal processor for download by a plurality of mobile devices;

creating a one-time passcode (OTP) by the MDM portal processor, the OTP for permitting the plurality of mobile devices administered by the admin person to access the MDM portal processor;

causing by the MDM portal processor display of the OTP on a computer display device;

receiving into the MDM portal processor a verbalization of the OTP, the verbalization of the OTP provided by the admin person and recorded by the plurality of mobile devices and provided from the plurality of mobile devices to the MDM portal processor;

analyzing by the MDM portal processor the verbalization of the OTP based on the OTP that was displayed on the computer display device and the received voice sample of the admin person via one or more artificial intelligence processes; and registering the plurality of mobile devices by the MDM portal processor in response to the one or more artificial intelligence processes verifying authenticity of the admin person.

10. The mobile device management (MDM) system of claim 9, wherein the one or more artificial intelligence processes comprise one or more of a natural language process and a machine learning voice recognition process.

11. The mobile device management (MDM) system of claim 9, wherein the analyzing the verbalization of the OTP via the one or more artificial intelligence processes comprises a machine learning recognition process of a comparison of characteristics of the verbalization of the OTP and characteristics of the voice sample of the admin person.

12. The mobile device management (MDM) system of claim 9, wherein the analyzing the verbalization of the OTP via the one or more artificial intelligence processes comprises a natural language process of comparing the verbalization of the OTP with the OTP that was displayed on the computer display device.

13. The mobile device management (MDM) system of claim 9, wherein the MDM portal processor is associated with a cloud server.

14. The mobile device management (MDM) system of claim 9, wherein the OTP comprises a limited lifetime.

15. The mobile device management (MDM) system of claim 9, wherein the OTP comprises a limit on a number of mobile devices that can use the OTP.

16. The mobile device management (MDM) system of claim 9, wherein the computer display device is associated with a cloud portal interface or a web page.

17. A non-transitory machine-readable medium comprising instructions that when executed by a computer processor execute a process comprising:

receiving into the computer processor a voice sample of an admin person;

providing an MDM agent by the computer processor for download by a plurality of mobile devices;

creating a one-time passcode (OTP) by the computer processor, the OTP for permitting the plurality of mobile devices administered by the admin person to access the computer processor;

causing by the computer processor display of the OTP on a computer display device;

receiving into the computer processor verbalization of the OTP, the verbalization of the OTP provided by the admin person and recorded by the plurality of mobile devices and provided from the plurality of mobile devices to the computer processor;

analyzing by the computer processor the verbalization of the OTP based on the OTP that was displayed on the computer display device and the received voice sample of the admin person via one or more artificial intelligence processes; and registering the plurality of mobile devices by the computer processor in response to the one or more artificial intelligence processes verifying authenticity of the admin person.

18. The non-transitory machine-readable medium of claim 17, wherein the one or more artificial intelligence processes comprise one or more of a natural language process and a machine learning voice recognition process.

19. The non-transitory machine-readable medium of claim 17, wherein the analyzing the verbalization of the OTP via the one or more artificial intelligence processes comprises a machine learning recognition process of a comparison of characteristics of the verbalization of the OTP and characteristics of the voice sample of the admin person.

20. The non-transitory machine-readable medium of claim 17, wherein the analyzing the verbalization of the OTP via the one or more artificial intelligence processes comprises a natural language process of comparing the verbalization of the OTP with the OTP that was displayed on the computer display device.

* * * * *